United States Patent [19]

Spinner

[11] Patent Number: 4,594,474

[45] Date of Patent: Jun. 10, 1986

[54] CONNECTING DEVICE FOR COAXIAL CABLES

[76] Inventor: Georg Spinner, Am Eichberg 12, 8152 Feldkirchen-Westerham, Fed. Rep. of Germany

[21] Appl. No.: 697,736

[22] Filed: Feb. 4, 1985

[30] Foreign Application Priority Data

Feb. 3, 1984 [DE] Fed. Rep. of Germany ....... 3403805

[51] Int. Cl.$^{4}$ ............................................ H02G 15/08

[52] U.S. Cl. ................................ 174/88 C; 174/21 C

[58] Field of Search ....................... 174/21 C, 88 C, 29

[56] References Cited

U.S. PATENT DOCUMENTS 2,133,448 10/1938 Harley ............................ 174/21 C
2,461,834 2/1949 Morin .................................. 174/29
3,753,287 8/1973 Ziemek et al. ............... 174/21 C X
3,787,607 1/1974 Schlafly ........................... 174/88 C
3,804,972 4/1974 Gommans et al. .............. 174/88 C
3,872,237 3/1975 Eyre et al. ....................... 174/88 C
3,881,050 4/1975 Jaggi ............................ 174/21 C X

FOREIGN PATENT DOCUMENTS 170798 3/1952 Austria ............................ 174/21 C

*Primary Examiner*—Arthur T. Grimley
*Assistant Examiner*—Morris H. Nimmo
*Attorney, Agent, or Firm*—Henry M. Feiereisen

[57] ABSTRACT

A device for connecting coaxial cables includes an inner bridging member rigidly connecting the inner conductors of the cables to be linked. The outer conductors of the cable are connected by a metal sleeve which resiliently surrounds and contacts both outer conductors and is clamped in circumferential direction. The sleeve is divided in distinct sections whereby those sections surrounding the conductors to be connected are provided with webs extending radially inwardly so as to provide the resilience of the sleeve.

12 Claims, 6 Drawing Figures

FIG. 2
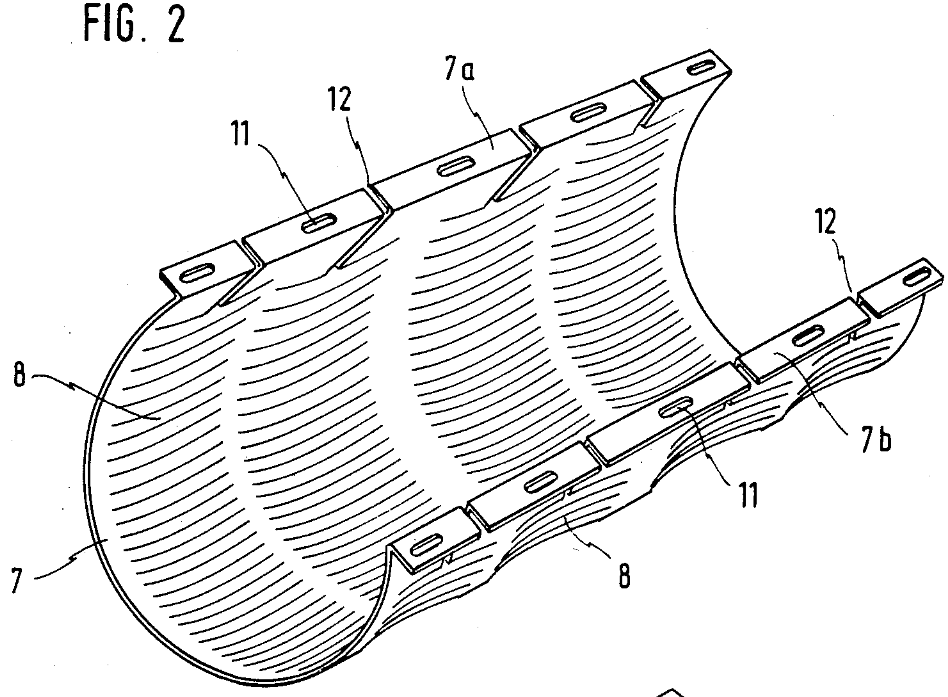
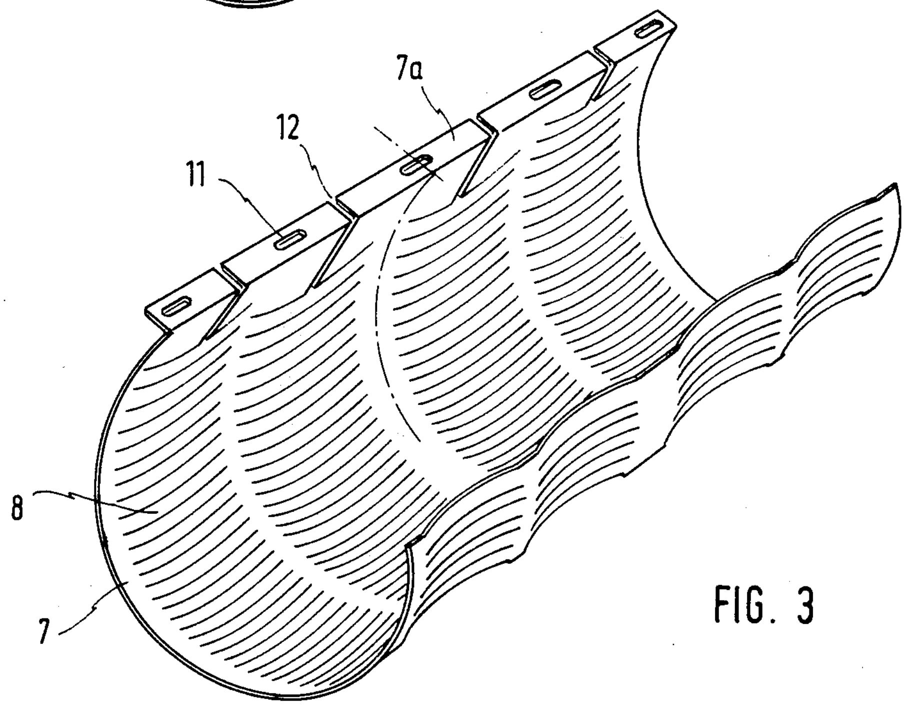
FIG. 3

CONNECTING DEVICE FOR COAXIAL CABLES

FIELD OF THE INVENTION

My present invention relates to a connecting device for cables, and in particular for coaxial cables whose inner conductors and outer conductors are to be linked.

BACKGROUND OF THE INVENTION

For extensive coaxial cable installations, e.g. for cable television, cables of different attenuation qualities are used whereby the connection of cables with an outer diameter of approximately 20 mm is provided with known coupling fittings. Due to the extreme rigidness of cables with a larger diameter, connection of the inner conductors which may be solid and are usually made of flat or corrugated copper pipes, and of the outer conductors made of corrugated copper pipes or flat aluminum pipes require special and rather complicated connecting devices.

It is known to connect the inner conductors with a rigid inner bridging member consisting of several portions screwed to each other while the outer conductors are bridged by an outer bridging member which is rigid as well. This outer member includes up to three short pipe segments which are screwed to each other as well as to the outer conductors via ring flanges. Consequently, the outer conductors must first be crimped with a special implement in order to provide the required flange portion.

Moreover, since the connection of the outer conductors is also rigid, problems occurred in static respect.

OBJECT OF THE INVENTION

It is thus the principal object of my invention to provide an improved connecting device for cables, in particular coaxial cables, obviating the afore-stated drawbacks.

In particular, it is an object of my invention to provide a connecting device for coaxial cables of any diameter in which the outer conductors can be cut straight and be bridged in an easy and quick manner without requiring special implements.

SUMMARY OF THE INVENTION

I realize these objects according to the present invention by providing a sleeve bridging the outer conductors of the coaxial cables and being tightened in circumferential direction. The sleeve, preferably a metal sleeve, has one portion which resiliently surrounds and contacts the conductor of one cable and another portion which resiliently surrounds and contacts the conductor of the other cable.

Due to its simple structure, the provision of such a sleeve considerably reduces the installation thereof and thus the connection between the conductors. Especially when connecting coaxial cables, it is now possible to rigidly connect the inner conductors by conventional means while the outer conductors of the coaxial cables are elastically connected to a certain degree, thus avoiding the afore-stated drawbacks of the prior art. The installation of the sleeve is faster than previously known and and does not require special implements.

According to another feature of the invention, the portions of the sleeve respectively embracing the outer conductors are provided with annular sections of concave shape so as to be radially inwardly vaulted and thus having an area of reduced diameter. The concave shape of these sections allows a contact with the embraced conductor.

For providing a resilience of the sleeve, and in particular of the annular concave shaped sections, the latter are provided with axis parallel slots so as to create webs between adjacent ones of the slots. These webs are thus resilient in radial direction.

There are a variety of solutions to tighten the metal sleeve in circumferential direction in order to provide an intimate contact with both outer conductors as well as a high-frequency tight connection of the latter. In case of coaxial cables of small diameter, the tightening is sufficiently provided by a heat-shrinkable tube covering the sleeve.

Preferably is, however, to provide the tightening with a protective jacket completely surrounding the sleeve which together with the jacket is tightened in circumferential direction.

According to another teaching of my invention, the sleeve is provided with at least one skirt projecting radially outwardly and being provided with boreholes through which tightening screws are guided to eventually provide tightening of the sleeve either directly or via the outer heat-shrinkable tube. In case, the screws directly engage with the metal sleeve, the latter is provided with two such skirts whereby the aligned boreholes of the skirts define a circumferential circle which is beyond the circumferential circle defined by the annular circles so that a tensile-proof connection is thus obtained.

BRIEF DESCRIPTION OF THE DRAWING

The above and other features of my present invention will now be described in detail with reference to the accompanying drawing in which:

FIG. 2 is a perspective view of a first embodiment of a metal sleeve of the connecting device according to the invention;

FIG. 3 is a perspective view of a second embodiment of the metal sleeve;

DESCRIPTION OF THE PREFERRED EMBODIMENTS

Figure 1:
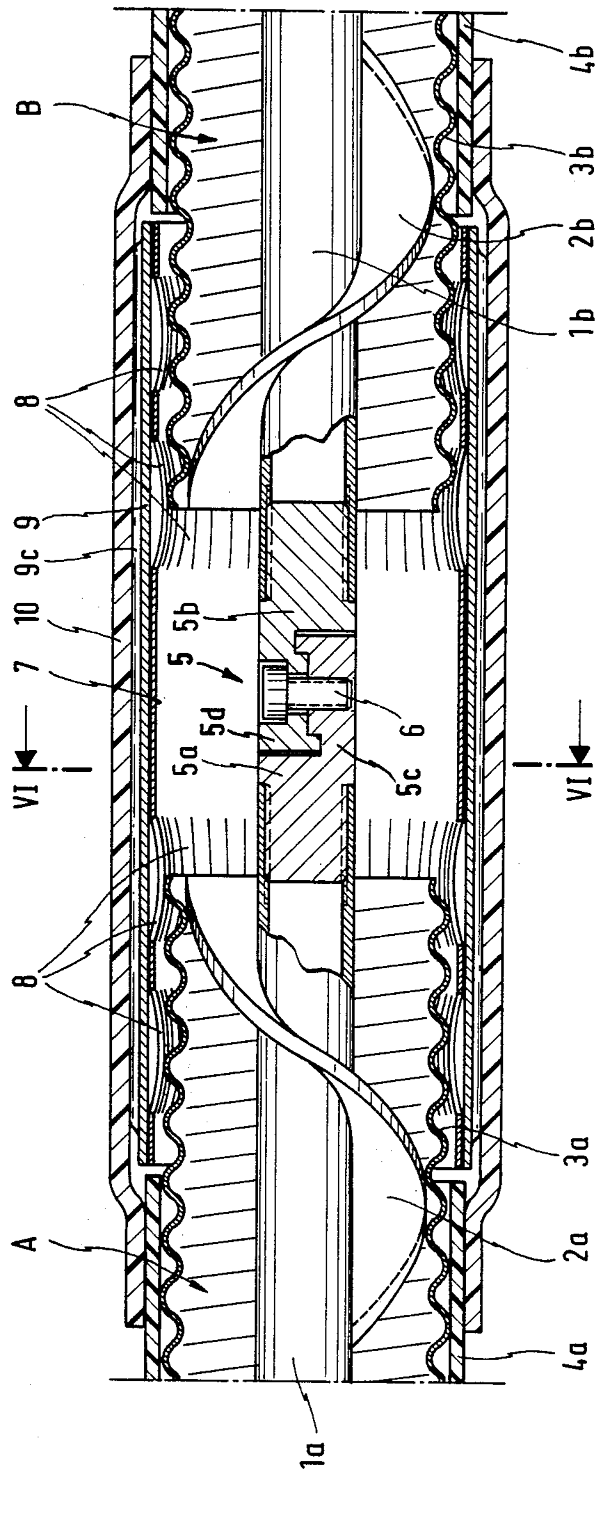
FIG. 1 is a longitudinal section of a connecting device according to the invention bridging two coaxial cables to each other.

Referring firstly to FIG. 1 in which two coaxial cables A,B are shown with their respective extremities cut in straight manner and facing each other. Each coaxial cable A,B includes one tubular conductor **1*a*,1*b* centered inside and being insulated from a corrugated outer conductor 3*a*,3*b*. For providing centering of the inner conductors 1*a*,1*b*, a dielectric strip 2*a*,2*b* extends in a helical manner over the length of each inner conductor 1*a*,1*b*. The outer conductors 3*a*,3*b* are surrounded almost along their entire length with an insulation 4*a*,4*b*. Only along the extremities, the conductors 3*a*,3*b*** are exposed in order to allow their connection with each other, as will be described hereinbelow.

The inner conductors 1a,1b are rigidly connected by a bridging member 5 which is known per se and thus illustrated only schematically. The bridging member 5 includes two parts 5a,5b with profiled ends 5c,5d meshing with each other. For connecting the inner conductors 1a,1b, the individual parts 5a,5b are screwed into the associated extremities of the tubular conductors 1a,1b such that the profiled ends 5c,5d project beyond the conductors 1a,1b and engage with each other. By means of a countersunk screw 6 which extends through the profiled ends 5c,5d the individual parts 5a,5b are tightly fastened with each other.

The connection of the outer conductors 3a,3b is obtained by a thin and elastic metal sleeve 7 which embraces the facing extremities of the outer conductors 3a,3b of the coaxial cables A,B. Those portions of the sleeve 7 embracing the conductors 3a,3b are sectionalized in distinct annular sections provided with a plurality of contact studs or webs 8 which extend in axial direction but are inwardly vaulted so as to be of reduced diameter. Consequently, these concave-shaped webs 8 and thus the annular sections are resilient in radial direction and provide contact with the surrounded outer conductor 3a,3b when the sleeve 7 is tightened.

Figure 5:
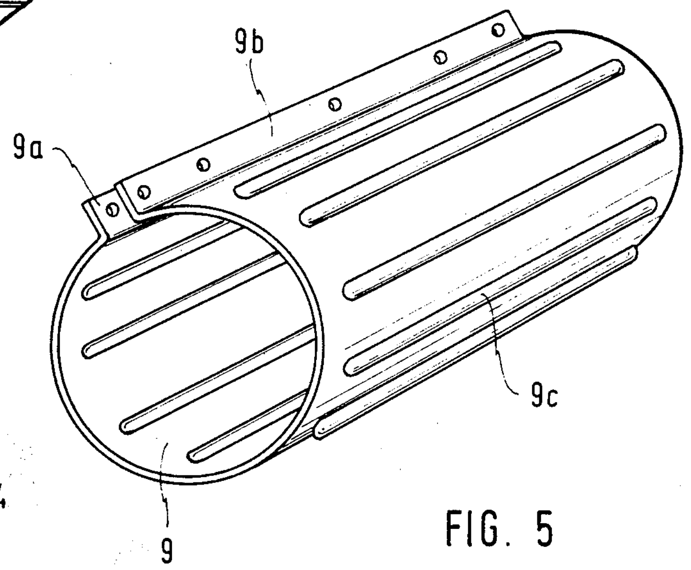
FIG. 5 is a perspective view of a protective jacket of the connecting device according to the invention.

There are a variety of possibilities to provide a tightening of the metal sleeve 7 in circumferential direction. One such possibility is illustrated in FIG. 1 in which a protective jacket 9 is shown surrounding the sleeve 7 for tightening the latter and simultaneously providing a required flexural strength. As is shown in FIG. 5, the protective jacket 9 is thus of essentially cylindrical shape with a continuous axially extending slot 9e. Consequently, two longitudinal skirts 9a,9b are defined which project at an angle with respect to the remaining portion of the jacket 9. The skirts 9a,9b are provided with a similar pattern of boreholes 9d so that a borehole 9d in the skirt 9a faces a borehole 9d in the skirt 9b.

The protective jacket 9 is further provided with elongated reinforcing ribs or reinforcing webs 9c which extend in axial direction and may be obtained e.g. by profiling the respective metal sheet forming the jacket 9. In this connection, it should be noted that the protective jacket 9 may consist of two semi-shells connected to each other.

For providing a protection against corrosion, the protective jacket 9 is embraced by a heat-shrinkable tube 10 which extends beyond the jacket 9 to sufficiently overlap the insulation 4a,4b as well. It should be noted, however, that in some cases e.g. when coaxial cables of small diameters are concerned, the protective outer jacket 9 can be omitted so that the tube 10 is directly arranged over the metal sleeve 7.

Turning now to FIGS. 2 and 3 in which two embodiments of the metal sleeve 7 are shown in more detail prior to their assembling. Accordingly, the metal sleeve 7 is divided by a centered surface line 16 into a plurality of distinct sections 7′—in the present case 4 sections. Each of the sections 7′ is provided with webs 8 which are resilient in radial direction. Consequently, when the sleeve 7 is mounted to bridge the outer conductors 3a,3b, two sections 7′ embrace the end portion of the conductor 3a while the other two sections surround the end portion of the other conductor 3b. As will be explained hereinafter, the webs 8 are obtained through cutting or punching out of a number of axis parallel slots 13 and subsequent cambering of the metal sleeve 7 by radially vaulting each section inwardly i.e. in direction toward the outer conductors 3a,3b to provide the required contact after installing the sleeve 7 and tightening the latter to bridge the conductors 3a,3b.

As already mentioned, when coaxial cables A,B of small diameter are to be connected, the tube 10 can directly be arranged over the sleeve 7. In this case, however, the sleeve 7 is not provided with angularly projecting skirts 7a,7b but its respective end portions simply overlap each other when surrounding the outer conductors 3a,3b. Advantageous, however, is to provide the sleeve 7 with longitudinal skirts 7a,7b as shown in FIG. 2 or only with one longitudinal skirt 7a as illustrated in FIG. 3. The latter embodiment with only one skirt is preferred as it allows also easy adjustment to coaxial cables A,B of various diameters.

Each of the skirts 7a,7b projects radially outwardly and is divided in distinct sections separated by intermediate slots 12 which extend in circumferential direction to the respectively closest slot 13. During cambering, the slots 12 compensate shortening of the metal sleeve 7.

In the embodiment of FIG. 2, each section of the skirts 7a,7b is provided with e.g. an elongated borehole 11 so that the metal sleeve 7 can be tightened by respective screws extending through two facing boreholes 11. For providing a tensile strength of the connection, two aligned boreholes 11 define a circumferential circle which is not concentric to the circle defined by the individual sections of the sleeve 7, i.e. when the sleeve 7 surrounds the facing extremities of the conductors 3a,3b, the skirts 7a,7b are still arranged at an angle relative to each other so that a tensile-proof connection is then obtained by tightening with respective screws engaging respective boreholes 11.

Figure 6:
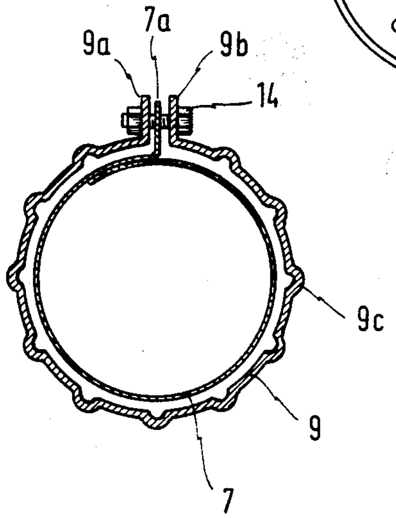
FIG. 6 is a sectional view of the connecting device according to the invention taken along line VI—VI in FIG. 1.

In contrast to the embodiment of FIG. 2, the sleeve 7 according to FIG. 3 has only one longitudinal skirt 7a and is thus to be tightened or clamped by means of the jacket 9 in a manner as shown in particular in FIG. 6. During installation of the sleeve 7, the skirt 7a extends parallel to the skirts 9a,9b of the protective jacket 9. The skirt 7a and the skirts 9a,9b are provided with the same borehole pattern so that the screws 14 are able to penetrate through aligned boreholes to tighten the sleeve 7. Since the metal sleeve 7 has a larger circumference than the outer conductors 3a,3b of the associated coaxial cables A,B and is only provided with one angularly projecting skirt 7a, the other free skirt thereof extends beyond the skirt 7a by a small portion so that the sleeve adjusts to various diameters of the cables A,B.

Figure 4:
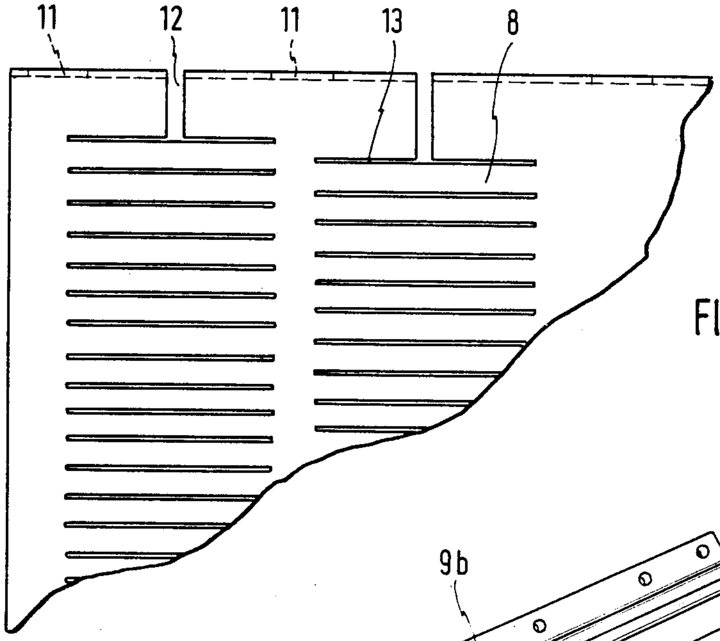
FIG. 4 is a developed view of the metal sleeve according to FIGS. 1 and 2.

Referring now to FIG. 4 in which a developed view of the metal sleeve 7 is shown. Accordingly, the sections 7′ of the sleeve 7 are provided with axis parallel slots 13 obtained by conventional means like cutting or punching and which define the radially resilient webs 8 therebetween. The slots 13 of adjacent sections 7′ are provided in a staggered manner relative to each other i.e. that inbetween two adjacent slots 13 of one section 7′ a slot 13 extends in the other section 7′. The skirt of the sleeve 7 which is free of slots 13 is subdivided by the intermediate slots 12 which extend normal to the slots 13 so as to divide the skirt into distinct sections. The slots 12 extend to the uppermost or closest slot 13 or web 8 of the associated section 7′ and thus are arranged at the apex of the subsequent cambering. In addition, the location of the boreholes 11 provided in each section 7′ is illustrated.

While the invention has been illustrated and described as embodied in a connecting device for coaxial cables, it is not intended to be limited to the details shown since various modifications and structural changes may be made without departing in any way from the spirit of my present invention.

What is claimed as new and desired to be protected by Letters Patent is set forth in the appended claims:

1. A connection of coaxial cables each having an inner conductor and an outer conductor, said connection comprising:

bridging means connecting said inner conductors of said coaxial cables;

a sleeve bridging said outer conductors of said coaxial cables and having one portion resiliently surrounding and contacting said outer conductor of one of said cables and another portion resiliently surrounding and contacting said outer conductor of said other cable, each of said portions including at least one annular section which is arched radially inwardly and is provided with a plurality of slots extending parallel to each other to define radially resilient webs between said slots; and clamping means for tightening said sleeve in circumferential direction.

2. A connection as defined in claim 1 wherein said sleeve is of metal.

3. A connection as defined in claim 1 wherein said clamping means includes a heat-shrinkable tube which surrounds said sleeve.

4. A connection as defined in claim 1 wherein said sleeve is provided with at least one longitudinal skirt projecting radially outwardly at an angle with respect to said sleeve and having at least one borehole for allowing said clamping means to fasten said sleeve.

5. A connection as defined in claim 14 wherein said clamping means includes a protective jacket surrounding said sleeve and having a continuous longitudinal slot so as to define two longitudinal skirts facing each other and projecting radially and outwardly, said skirts of said jacket being provided with at least two aligned boreholes, and further including at least one tightening screw, said longitudinal skirt of said sleeve extending inbetween said skirts of said protective jacket wherein said borehole of said skirt of said sleeve is in alignment with said boreholes of said skirts of said jacket so that said sleeve is tightened by said screw traversing said boreholes.

6. A connection as defined in claim 5 wherein said protective jacket is provided with reinforcing ribs extending in axial direction.

7. A connection as defined in claim 5 wherein said protective jacket is made of two semi-shells.

8. A connection as defined in claim 5 wherein said clamping means further includes a heat-shrinkable tube covering said protective jacket.

9. A connection as defined in claim 4 wherein said skirt of said sleeve is subdivided by at least one slot extending radially in circumferential direction of said sleeve in the region of said slots to allow compensation of a shortening of said sleeve during cambering.

10. A connection as defined in claim 9 wherein said skirt of said sleeve defines an edge, said slot extending from said edge in radial direction along a predetermined length.

11. A connection as defined in claim 4 wherein each of said portions includes at least one annular section of concave shape so as to be radially inwardly vaulted to allow contact with the associated one of said conductors, said sleeve including two such longitudinal skirts with aligned boreholes wherein said aligned boreholes define a circumferential circle extending beyond the circumferential circle defined by said annular section.

12. A connection of conductors of cables, comprising: a sleeve bridging the cables and having one portion resiliently surrounding and contacting the conductor of the one cable and another portion resiliently surrounding and contacting the conductor of the other cable, each of said portions including at least one annular section which is arched radially inwardly and is provided with a plurality of slots extending parallel to each other to define radially resilient webs between said slots; and clamping means for tightening said sleeve in circumferential direction.

* * * * *